United States Patent
Barc et al.

(10) Patent No.: US 10,218,790 B2
(45) Date of Patent: *Feb. 26, 2019

(54) PROVIDING ACCESS TO A RESOURCE FOR A COMPUTER FROM WITHIN A RESTRICTED NETWORK

(71) Applicant: International Business Machines Corporation, Armonk, NY (US)

(72) Inventors: Jakub Barc, Cracow (PL); Filip Barczyk, Cracow (PL); Marek Grochowski, Cracow (PL); Grzegorz Sawina, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/947,888

(22) Filed: Apr. 9, 2018

(65) Prior Publication Data

US 2018/0227366 A1 Aug. 9, 2018

Related U.S. Application Data

(63) Continuation of application No. 14/279,350, filed on May 16, 2014, now Pat. No. 9,973,577.

(30) Foreign Application Priority Data

May 28, 2013 (GB) .................................. 1309467.7

(51) Int. Cl.
*G06F 15/16* (2006.01)
*H04L 29/08* (2006.01)

(52) U.S. Cl.
CPC .............................. *H04L 67/1097* (2013.01)

(58) Field of Classification Search
CPC ... H04L 67/02; H04L 63/0272; H04L 63/029; H04L 63/10
See application file for complete search history.

(56) References Cited

U.S. PATENT DOCUMENTS 7,340,769 B2 * 3/2008 Baugher ................. G06F 21/10
  713/151
7,631,084 B2 * 12/2009 Thomas .................. H04L 29/06
  709/227

(Continued)

OTHER PUBLICATIONS

List of IBM Patents or Patent Applications Treated As Related; Date Filed: Apr. 9, 2018, 2 pages.

*Primary Examiner* — Shean Tokuta
(74) *Attorney, Agent, or Firm* — Cantor Colburn LLP

(57) ABSTRACT

Disclosed are systems, methods, and machine readable storage media that cause a storage computer and a client computer to perform a method of providing access to one or more resources on the storage computer for the client computer. The storage computer is operable for initiation of a network connection between the client computer and the storage computer. Initiation of the network connection between the client computer and the storage computer by the storage computer is enabled, and initiation of the network connection between the client computer and the storage computer by the client computer is disabled. The client computer and the storage computer are operable for maintaining the network connection between the client computer and the storage computer.

17 Claims, 2 Drawing Sheets

(56) References Cited

U.S. PATENT DOCUMENTS

| | | | | |
|---|---|---|---|---|
| 7,680,100 B1* | 3/2010 | Corliss | H04L 12/4633 | 370/354 |
| 7,698,388 B2* | 4/2010 | Hoover | G06F 21/6218 | 370/351 |
| 8,484,370 B1* | 7/2013 | Coffee | H04W 76/25 | 709/232 |
| 8,583,765 B1* | 11/2013 | Rachabathuni | H04W 76/10 | 709/219 |
| 8,683,019 B1* | 3/2014 | Breau | H04L 61/2575 | 709/220 |
| 8,843,622 B1* | 9/2014 | Graham | H04L 67/24 | 370/241 |
| 8,984,067 B2* | 3/2015 | Lau | H04L 65/1083 | 709/206 |
| 9,015,824 B1* | 4/2015 | Drewry | G06F 21/6218 | 726/15 |
| 9,137,209 B1* | 9/2015 | Brandwine | H04L 63/0272 | |
| 9,237,188 B1* | 1/2016 | Gabrielson | H04L 67/10 | |
| 9,317,671 B2* | 4/2016 | Malegaonkar | G06F 21/31 | |
| 2002/0062310 A1* | 5/2002 | Marmor | G06F 17/3087 | |
| 2003/0018753 A1* | 1/2003 | Seki | H04L 12/2803 | 709/219 |
| 2003/0030662 A1* | 2/2003 | Poisson | H04L 12/4641 | 715/735 |
| 2005/0114711 A1* | 5/2005 | Hesselink | H04L 63/0209 | 726/4 |
| 2006/0129694 A1* | 6/2006 | Ishida | H04L 12/2818 | 709/238 |
| 2007/0050591 A1* | 3/2007 | Boyd | G06F 9/461 | 711/171 |
| 2008/0016181 A1* | 1/2008 | Burckart | H04L 29/06027 | 709/219 |
| 2008/0043760 A1* | 2/2008 | Venkatraman | H04L 12/4641 | 370/401 |
| 2008/0178278 A1* | 7/2008 | Grinstein | H04L 63/0227 | 726/12 |
| 2008/0201486 A1* | 8/2008 | Hsu | H04L 29/06 | 709/238 |
| 2009/0070442 A1* | 3/2009 | Kacin | H04L 41/0803 | 709/221 |
| 2010/0005154 A1* | 1/2010 | Song | H04L 12/2803 | 709/219 |
| 2010/0017853 A1* | 1/2010 | Readshaw | H04L 63/102 | 726/3 |
| 2010/0037309 A1* | 2/2010 | Dargis | H04L 63/0272 | 726/13 |
| 2010/0131613 A1* | 5/2010 | Jonsson | H04L 12/281 | 709/218 |
| 2010/0186079 A1* | 7/2010 | Nice | H04L 63/0281 | 726/14 |
| 2010/0281534 A1* | 11/2010 | Poder | H04L 12/2812 | 726/15 |
| 2011/0119325 A1* | 5/2011 | Paul | H04L 67/1002 | 709/203 |
| 2011/0138058 A1* | 6/2011 | Ishida | H04L 12/4633 | 709/227 |
| 2011/0296049 A1* | 12/2011 | Wang | H04N 21/437 | 709/231 |
| 2012/0036231 A1* | 2/2012 | Thakur | H04L 45/00 | 709/220 |
| 2012/0117239 A1* | 5/2012 | Holloway | H04L 61/1511 | 709/226 |
| 2012/0226815 A1* | 9/2012 | Goodman | H04L 65/80 | 709/228 |
| 2012/0246226 A1* | 9/2012 | Anandam | H04L 67/06 | 709/203 |
| 2012/0263049 A1* | 10/2012 | Venkatachalapathy | H04L 41/0893 | 370/252 |
| 2012/0268553 A1* | 10/2012 | Talukder | H04L 12/1818 | 348/14.08 |
| 2012/0324041 A1* | 12/2012 | Gerber | H04L 67/26 | 709/217 |
| 2013/0021998 A1* | 1/2013 | Shatsky | H04W 28/26 | 370/329 |
| 2013/0124685 A1* | 5/2013 | Keitel | H04L 63/0272 | 709/218 |
| 2013/0144935 A1* | 6/2013 | Valdetaro | H04L 63/0281 | 709/203 |
| 2013/0147900 A1* | 6/2013 | Weiser | H04N 7/152 | 348/14.08 |
| 2013/0179541 A1* | 7/2013 | Chen | H04L 65/4084 | 709/219 |
| 2013/0227550 A1* | 8/2013 | Weinstein | G06F 9/45558 | 718/1 |
| 2013/0325931 A1* | 12/2013 | Cheng | H04L 67/42 | 709/203 |
| 2014/0052764 A1* | 2/2014 | Michael | G06F 17/30221 | 707/822 |
| 2014/0068038 A1* | 3/2014 | Brook | H04W 76/25 | 709/223 |
| 2014/0092418 A1* | 4/2014 | Kishimoto | H04N 1/00896 | 358/1.14 |
| 2014/0137180 A1* | 5/2014 | Lukacs | G06F 21/53 | 726/1 |
| 2014/0189800 A1* | 7/2014 | Fullarton | H04L 63/08 | 726/4 |
| 2014/0208393 A1* | 7/2014 | Yasukawa | H04L 29/12509 | 726/4 |
| 2014/0211764 A1* | 7/2014 | Sundararajan | H04W 56/0025 | 370/336 |
| 2014/0223096 A1* | 8/2014 | Zhe Yang | G06F 12/0871 | 711/114 |
| 2014/0258268 A1* | 9/2014 | Woods | G11B 27/10 | 707/722 |
| 2014/0337955 A1* | 11/2014 | Mendelovich | H04L 63/0807 | 726/9 |
| 2014/0358995 A1* | 12/2014 | Barc | H04L 67/1097 | 709/203 |
| 2015/0089061 A1* | 3/2015 | Li | H04W 4/70 | 709/226 |
| 2015/0120943 A1* | 4/2015 | Slupik | H04L 67/141 | 709/227 |

* cited by examiner

PROVIDING ACCESS TO A RESOURCE FOR A COMPUTER FROM WITHIN A RESTRICTED NETWORK

PRIORITY

This application is a continuation of U.S. patent application Ser. No. 14/279,350, filed May 16, 2014, which in turn claims priority to Great Britain Patent Application No. 1309467.7, filed 28 May 2013, and all the benefits accruing therefrom under 35 U.S.C. § 119, the entire contents of all the applications listed above are incorporated herein by reference.

BACKGROUND

An embodiment relates generally to computer networks, and more specifically, to providing access to a resource for a computer from within a restricted network.

Communication between computers using connection oriented protocols often suffers from the dilemma of security versus flexibility. Almost every computer is protected in our days by various software, such as firewalls and antivirus software. These protection measures may further include connecting computers into restricted networks, where communication with other computers outside the restricted network can be restricted or fully disabled.

In order to increase level of security, some contemporary systems allow only those computers outside the restricted network to initiate connections between computers in the restricted network and computers outside the restricted network. In this case only authorized users/computers outside the restricted network can connect to the computers within the restricted network and perform data exchange or any other necessary operations. This type of network configuration can hamper information leakage from within the restricted network, such as when a spyware on the computer within the restricted network connects this computer to a "pirate" computer outside the restricted network and downloads on the "pirate" computer confidential information for the computer within the restricted network.

Another mechanism used by contemporary systems to protect information exchange between computers within and outside the restricted network, is to use specialized solutions that include generic network file system protocols to create a dedicated protected communication channel between a computer outside the restricted network and the computer inside restricted network.

SUMMARY

One embodiment disclosed herein is a computer implemented method for providing access to one or more resources on a storage computer for a client computer. This method includes: receiving a description of needed resources at the storage computer; determining, by the storage computer, whether the storage computer has one or more resources matching the description of the needed resources; initiating, by the storage computer, the network connection between the client computer and the storage computer; and providing, to the client computer, access to one or more resources matching the description of the needed resources via the network connection between the client computer and the storage computer. This storage computer is operable to initiate a network connection between the client computer and the storage computer. A first initiation of the network connection between the client computer and the storage computer by the storage computer is enabled. A second initiation of the network connection between the client computer and the storage computer by the client computer is disabled.

Another embodiment disclosed herein is a system that includes a client computer and a storage computer. The storage computer has one or more needed resources by the client computer. A first initiation of the network connection between the client computer and the storage computer by the storage computer can be enabled. A second initiation of the network connection between the client computer and the storage computer by the client computer can be disabled. The storage computer includes a processor operable for: receiving, at the storage computer, a description of needed resources; determining, by the storage computer, whether the storage computer has one or more resources matching the description of the needed resources; initiating, by the storage computer, the network connection between the client computer and the storage computer; and providing, to the client computer, access to one or more resources matching the description of the needed resources via the network connection between the client computer and the storage computer.

Yet another embodiment disclosed herein is a computer program product for providing access to one or more resources on a storage computer for a client computer. The computer program product comprises a computer readable storage medium having program instructions embodied therewith. The program instructions are readable by a processing circuit to cause the processing circuit to perform a method comprising: receiving, at the storage computer, a description of needed resources; determining, by the storage computer, whether the storage computer has one or more resources matching the description of the needed resources; initiating, by the storage computer, the network connection between the client computer and the storage computer; and providing, to the client computer, access to one or more resources matching the description of the needed resources to the client computer via the network connection between the client computer and the storage computer. A first initiation of the network connection between the client computer and the storage computer by the storage computer is enabled. A second initiation of the network connection between the client computer and the storage computer by the client computer is disabled.

BRIEF DESCRIPTION OF THE SEVERAL VIEWS OF THE DRAWINGS

Embodiments of the present invention will be readily understood by the following detailed description in conjunction with the accompanying drawings.

DETAILED DESCRIPTION

Figure 1:
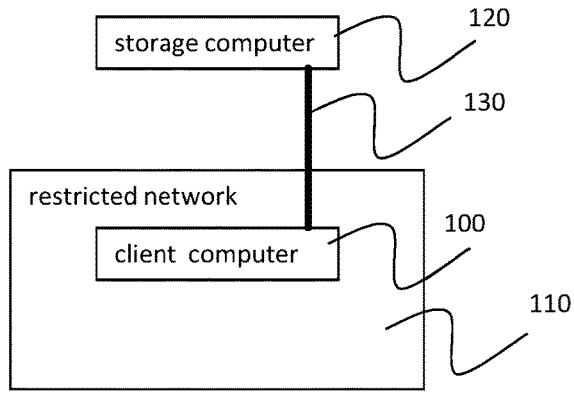
FIG. 1 is a block diagram illustrating a network connection between a storage computer and a client computer within a restricted network, in accordance with an embodiment of the present invention.

Various embodiments disclosed herein provide effective and secure communication of computers within and outside a restricted network using connection oriented protocols. Contemporary solutions involve separated network zones (sometimes called restricted networks, restricted network zones, red zones, networks behind restrictive firewall, etc.). Security policies do not allow computers within these restricted networks to initiate connections to computers outside these restricted networks. Computers outside these restricted networks are allowed to initiate connections to computers within these restricted networks, but typically only after authentication of users operating the computers outside the restricted networks, by firewalls protecting these restricted networks.

Some issues related to the aforementioned security policy can be illustrated in the following example. Due to the fact that these restricted networks are often used for testing and development, developers or testers are often forced to copy every change made on their workstations outside a restricted network to test and development workstations within the restricted network. This can be a serious development performance hit. In cases where a development environment is not separated by a firewall, the most common and the simplest way is to mount a remote directory (i.e. developer's directory on his workstation outside the restricted network) on the test and development workstation and run tests and programs directly from the developer's workstation, as if they were located on local storage. However, due to the fact that mounting requires initiating a connection through the restrictive firewall, this solution is not possible. There are of course ways to circumvent this inconvenience. However each of them has drawbacks. One plausible solution is utilization of a version control system operating within the restricted network. In this case developers commit their changes to a repository, which are then updated on the test and development workstation. This has an obvious negative impact, because optional compiling takes place on the test and development workstation, while only a source code provided by developers is stored in the repository, as a result the repository might grow to a vast size due to checks-in of compiled binaries. Another plausible solution is utilization of a secure connection like "Layer 3 Tunnel" between the developer's workstation outside the restricted network and the test and development workstation within the restricted network using generic network file system protocols to mount developer's directory on the test and development workstation. This can be operated in a fast way, however creating of such connections may be considered to be breaking of security policies, since it allows the test and development workstation within the restricted network initiation of connections with computers outside the restricted network. Moreover mandatory ciphering (a conventional attribute of the "Layer 3 Tunnel" connection) might impact network throughput.

One or more of the embodiments disclosed herein may provide a solution to these and other problems. Embodiments disclosed herein can also be used in cases utilizing connected-oriented network connections between a client computer and a storage computer, where initiation of a network connection between the client computer and the storage computer by the client computer is disabled, but initiation of a network connection between the client computer and the client computer by the storage computer is enabled. These restrictions on connection initiation can be implemented in a various ways. By analogy with the previous illustration, the client computer can be within a restricted network, or hardware and/or software of the client computer can be configured to disable initiation of a network connection between the client computer and the client computer by the storage computer. Despite aforementioned restrictions some embodiments disclosed herein provide a solution for supporting network attached storage (NAS) on the storage computer used by a client computer.

One or more of the embodiments disclosed herein allow for passive storage functionality on smartphones. This functionally enables importing a smartphone local memory on a personal computer. In this case, according to the aforementioned scheme of communication between the storage computer and the client computer, the smartphone acts as a storage computer and the personal computer acts as a client computer. The passive storage functionality of the smartphones can be use, for example, in the following applications. The resources of smartphone might be accessible from personal computer for purpose of browsing stored data like photos, music, notes, etc. Direct access to the smartphone local memory might be used to ease development of applications. If the smart phone acts as the client computer in the aforementioned scheme, then it will be able to import various resources from computers, servers, workstations, etc. within restricted networks. This configuration can be used in applications such as the following. A personal computer and a NAS server are within a home network having a network address translation (NAT) functionality. Embodiments disclosed herein allow a user to connect to the personal computer and/or the NAS server from outside the home network using a smartphone or a computer and listen to the music files stored on the personal computer and/or the NAS server.

It should be appreciated that embodiments described herein can be implemented in numerous ways, including as a system, comprising at least a client computer within the restricted network and a storage computer outside the restricted network, a method, a computer code, one or more machine readable media embodying computer instructions causing the client computer and the storage computer to perform the method, and a device. Several inventive embodiments are described below.

FIG. 1 illustrates a system comprising a client computer 100 and a storage computer 120. The storage computer has one or more needed resources needed by the client computer. Initiation of the network connection 130 between the client computer and the storage computer by the storage computer is enabled. Initiation of the network connection between the client computer and the storage computer by the client computer is disabled. The latter two constrains refer to a computer environment described in the first two paragraphs of this section; initiation of connections may be enabled and disabled e.g. based on security policy. For instance, the storage computer can be a private computer of a company employee that is stationed at home and connected to a public network. The client computer can be a company computer of the company employee stationed in a company office and connected to a restricted company network. The system is operable for: receiving a description of needed resources at the storage computer; checking on the storage computer whether the storage computer has one or more resources matching the description of the needed resources; initiating the network connection by the storage computer between the client computer and the storage computer; and providing access to one or more resources matching the description of the needed resources to the client computer via the network connection between the client computer and the storage computer.

In another embodiment of the present invention the system is further operable for preparing the description of needed resources needed by a software operating on the client computer. In another embodiment of the present invention the system is further operable for generating the description of needed resources needed by a software operating on the client computer.

Figure 2:
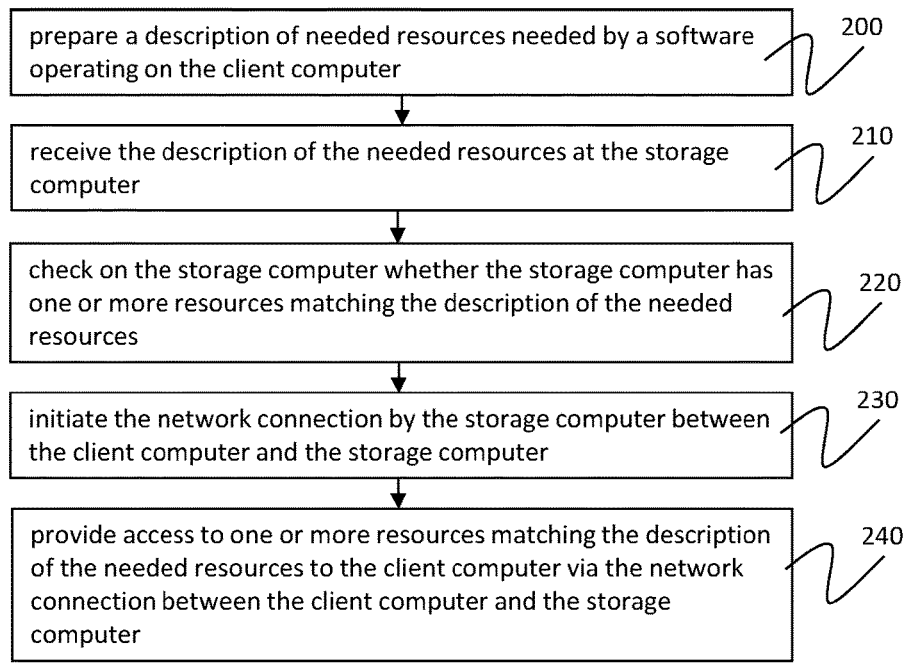
FIG. 2 is a flowchart illustrating execution of providing access to one or more resources on a storage computer for a client computer, in accordance with another embodiment of the present invention.

FIG. 2 illustrates a flowchart of a computer implemented method for providing access to one or more resources on the storage computer 120 to the client computer 100. Initiation of the network connection 130 between the client computer and the storage computer by the storage computer is enabled. Initiation of the network connection between the client computer and the storage computer by the client computer is disabled. The computer implemented method comprises the following steps. A process step 210 represents receiving a description of needed resources at the storage computer. A process step 220 represents checking on the storage computer whether the storage computer has one or more resources matching the description of the needed resources. A process step 230 represents initiating the network connection by the storage computer between the client computer and the storage computer. A process step 240 represents providing access to one or more resources matching the description of the needed resources to the client computer via the network connection between the client computer and the storage computer.

In yet in another embodiment disclosed herein, the computer implemented method further comprises a process step 200 representing preparing the description of needed resources needed by software operating on the client computer.

In yet in another embodiment disclosed herein, the description of the needed resources can be downloaded to the storage computer via the network connection between the client computer and the storage computer. This can be done for instance after the storage computer initiates the network connection between the storage computer and the client computer by employing a connection oriented protocol between the storage computer and the client computer.

In yet in another embodiment disclosed herein, the description of the needed resources can be dispatched to the storage computer from the client computer using well known services in this field like E-Mail. In such a case, the storage computer is typically aware of the resources needed by the client computer at the time of initiating the network connection in order to provide access to the resources.

In yet in another embodiment disclosed herein, the client computer and the storage computer are operable for maintaining the network connection between the client computer and the storage computer. The network connection can be a connection oriented protocol. Maintenance of the network connection can be made by sending data packets between the client computer and the storage computer on a regular basis via the network connection. These data packets may be idle or may contain the description of the needed resources. The description of the needed resources may by updated every time it is sent to the storage computer.

In yet in another embodiment disclosed herein, the network connection between the client computer and the storage computer is made using a connection oriented protocol, wherein providing the description of the needed resources to the storage computer is performed on a periodic basis. The connection oriented protocol can be but not limited to: Transmission Control Protocol (TCP), internetwork Packet Exchange/Sequenced Packet Exchange (IPX/SPX), Stream Control Transmission Protocol (SCTP).

In yet in another embodiment disclosed herein, the client computer is configured to disable initiation of the network connection between the client computer and the storage computer by the client computer.

In yet in another embodiment disclosed herein, hardware and/or software of the client computer are configured to disable initiation of the network connection between the client computer and the storage computer by the client computer.

In yet in another embodiment disclosed herein, the client computer is within a restricted network and the storage computer is outside the restricted network, wherein the restricted network is configured to disable initiation of the network connection between the client computer and the storage computer by the client computer.

In yet in another embodiment disclosed herein, the storage computer is configured to disable initiation of the network connection between the client computer and other computers by other computers.

In yet in another embodiment disclosed herein, the storage computer is within a second restricted network and the client computer is outside the second restricted network, wherein the second restricted network is configured to disable initiation of the network connection between the client computer and the storage computer by the client compute or any other computer outside the second restricted network.

The description of the needed resources can be implemented in various ways. The description may include one or more file specifications like name, creation date and/or time, version number, extension type, size, special markers within bodies of files, encryption type, etc. Another way of describing the needed resources may be describing functionalities of the needed resources like a text viewing program operable for viewing Microsoft Word documents, or a codec for video player XYZ operable for playing audio video interleave (AVI) extensions, etc. Alternatively the description of the needed resources may include a combination of the file attributes and the functionality descriptions. The mount points ("imports") in the next paragraph are a further example of description of the needed resources.

Figure 3:
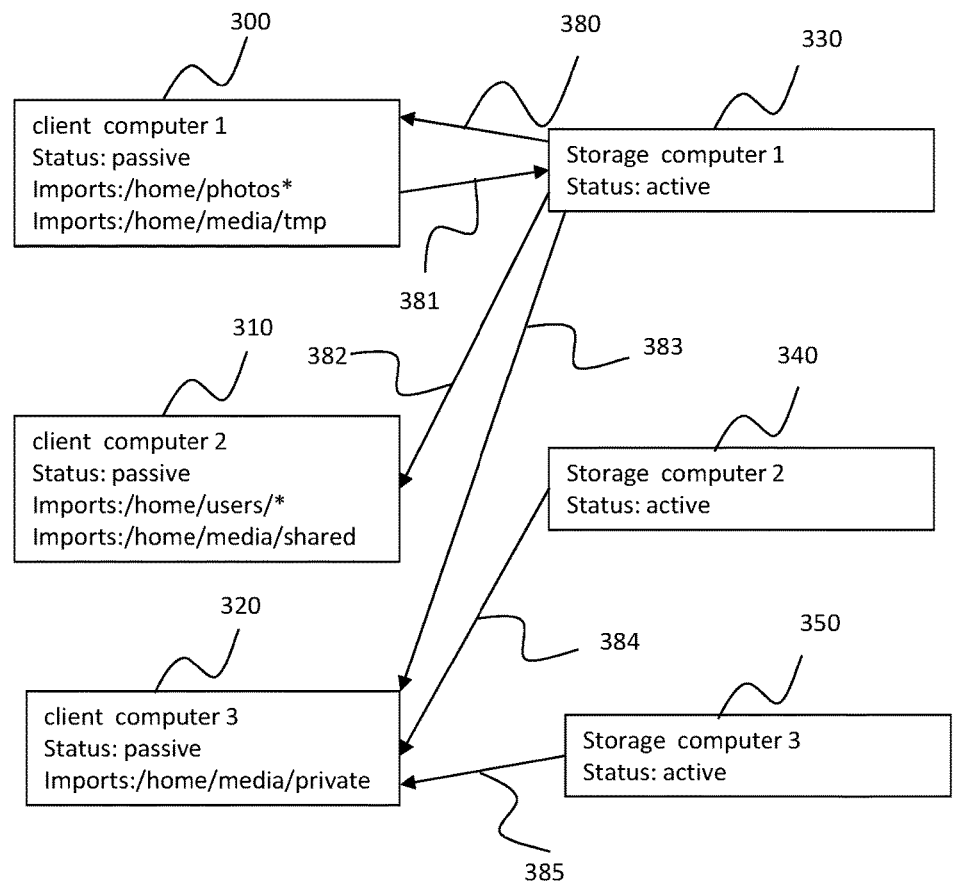
FIG. 3 is a block diagram illustrating communication between client computers and storage computers, in accordance with yet another embodiment of the present invention.

An example of communication between three client computers (first, second, and third) 300, 310, 320 and three storage computers (first, second, and third) 330, 340, 350 is illustrated in FIG. 3 in accordance with yet another embodiment of the present invention. The storage computers have active status, i.e. they are configured to enable initiation of the network connection between the storage computers and the client computers by the storage computers. The client computers have passive status, i.e. they are configured to disable initiation of the network connection between the storage computers and the client computers by the client computers. The first client computer 300 has the following mount points ("imports") configured to import/download resources: "/home/photos*10.0.0.0/8(ssl,rw,label=photos)" and "/home/media/tmp 10.0.0.0/16(rw)". The second client computer 310 has the following mount points ("imports") configured to download/import resources: "/home/users/*10.0.0.0/16(ssl,rw,auth=pam)" and "/home/media/shared 10.0.0.18(ro)". The third client computer 320 has the following mount points ("imports") configured to download/import resources: "/home/media/private 10.0.0.24(ssl,rw,path=/srv/my_privs)."

The "import" configuration of the first client computer means that it will accept a resource labeled with 'photos' from any host in 10.0.0.0/8 using ciphered network connection with read-write access and it will accept any resource with read-write access from 10.0.0.0/16 network. The "import" configuration of the second client computer means that it will accept any resource from 10.0.0.18 with read only access and it will accept a resource with target in /home/users/ from any host in 10.0.0.0/16 network using ciphered connection with read-write access and authentication using PAM method/module. The "import" configuration of the third client computer means that it will accept a resource/srv/my_privs from host 10.0.0.24 using ciphered connection with read-write access.

Each storage request for mount importing of the resource can be labeled with location of a target mount point. If the location of that mount point was specified, then it has to match "import" configuration. If there were no mount points requested, then the first import from "imports" which matches the Storage address is used. For security reasons, a dedicated protocol using a dedicated port number for a device can be employed.

The first storage computer 330 establishes network connections with the first, second and the third client computers 300, 310, 320. The second and third storage computers establish network connections with the third client device. The first client computer provides a first description of available resources to the first, second and third computers via network connections 380, 382, 383 between the first storage computer and the first, the second and the third client computers. The second storage computer provides a second description of available resources to the third storage computer via the network connection 384 between the second storage computer and the third client computer. The third storage computer provides a third description of available storage resources to the third storage computer via the network connection 385 between the third storage computer and the third client computer.

The first, the second and the third description of available resources can be labeled with target mount point, access type, host address, network address, etc. and/or contain other descriptions of these resources. Since the first client computer 300 has a matching "import" configuration and/or needs resources that match the description of the resources on the first description, it sends a request 381 for mounting of one or more resources on the first description to the first storage computer.

All aforementioned embodiments can further comprise a portion or all of the following features and/or functionalities: preparing a description of needed resources needed by a software operating on the client computer; downloading the description of the needed resources to the storage computer from the client computer via the network connection between the client computer and the storage computer; the client computer and the storage computer are operable for maintaining the network connection between the client computer and the storage computer, the network connection between the client computer and the storage computer is made using a connection oriented protocol, wherein providing the description of the needed resources to the storage computer is performed on a periodic basis; the client computer is configured to disable initiation of the network connection between the client computer and the storage computer by the client computer; the client computer is within a restricted network and the storage computer is outside the restricted network, wherein the restricted network is configured to disable initiation of the network connection between the client computer and the storage computer by the client computer.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for providing access to one or more resources on a storage computer for a client computer, the computer program product comprising:
a non-transitory computer readable storage medium having program instructions embodied therewith, the program instructions readable by a processing circuit to cause the processing circuit to perform a method comprising:
receiving a description of needed resources at the storage computer;
determining, by the storage computer, whether the storage computer has one or more resources matching the description of the needed resources;
initiating, by the storage computer, a network connection between the client computer and the storage computer;
providing access to one or more resources matching the description of the needed resources to the client computer via the network connection between the client computer and the storage computer, and
maintaining the network connection between the client computer and the storage computer, by sending data packets between the client computer and the storage computer on a regular basis via the network connection,
wherein the storage computer is operable for initiation of a network connection between the client computer and the storage computer, wherein a first initiation of the network connection between the client computer and the storage computer by the storage computer is enabled and a second initiation of the network connection between the client computer and the storage computer by the client computer is disabled.

2. The computer program product according to claim 1, wherein the method further comprises preparing the description of the needed resources by a software operating on the client computer.

3. The computer program product according to claim 1, wherein the method further comprises downloading the description of the needed resources to the storage computer from the client computer via the network connection between the client computer and the storage computer.

4. The computer program product according to claim 1, wherein the network connection between the client computer and the storage computer is made using a connection oriented protocol, wherein providing the description of needed resources to the storage computer is performed on a periodic basis.

5. The computer program product according to claim 1, wherein the client computer is configured to disable initiation of the network connection between the client computer and the storage computer by the client computer.

6. The computer program product according to claim 1, wherein the client computer is within a restricted network, wherein the storage computer is outside the restricted network, wherein the restricted network is configured to disable initiation of the network connection between the client computer and the storage computer by the client computer.

7. A system comprising:
a client computer; and
a storage computer, wherein the storage computer has one or more resources needed by the client computer, wherein initiation of a network connection between the client computer and the storage computer by the storage computer is enabled, wherein initiation of the network connection between the client computer and the storage computer by the client computer is disabled;
the storage computer including a processor operable for:
receiving, at the storage computer, a description of the needed resources;
determining, by the storage computer, whether the storage computer has one or more resources matching the description of the needed resources;

initiating, by the storage computer, the network connection between the client computer and the storage computer;

providing, to the client computer, access to one or more resources matching the description of the needed resources via the network connection between the client computer and the storage computer and maintain the network connection between the client computer and the storage computer, by sending data packets between the client computer and the storage computer on a regular basis via the network connection.

8. The system according to claim 7, wherein the processor is further operable for preparing the description of the needed resources by a software operating on the client computer.

9. The system according to claim 7, wherein the processor is further operable for downloading the description of the needed resources to the storage computer from the client computer via the network connection between the client computer and the storage computer.

10. The system according to claim 7, wherein the network connection between the client computer and the storage computer is made using a connection oriented protocol, and wherein providing the description of the needed resources to the storage computer is performed on a periodic basis.

11. The system according to claim 7, wherein the client computer is configured to disable initiation of the network connection between the client computer and the storage computer by the client computer.

12. The system according to claim 7, further comprising a restricted network, wherein the client computer is within the restricted network and the storage computer is outside the restricted network, wherein the restricted network is configured to disable initiation of the network connection between the client computer and the storage computer by the client computer.

13. A computer implemented method for providing access to one or more resources on a storage computer for a client computer, the method comprising:

receiving, at the storage computer, a description of needed resources;

determining, by the storage computer, whether the storage computer has one or more resources matching the description of the needed resources;

initiating, by the storage computer, a network connection between the client computer and the storage computer; and providing, to the client computer, access to one or more resources matching the description of the needed resources via the network connection between the client computer and the storage computer and maintaining the network connection between the client computer and the storage computer, by sending data packets between the client computer and the storage computer on a regular basis via the network connection, wherein the storage computer is operable for initiation of a network connection between the client computer and the storage computer, wherein a first initiation of the network connection between the client computer and the storage computer by the storage computer is enabled and a second initiation of the network connection between the client computer and the storage computer by the client computer is disabled.

14. The computer implemented method according to claim 13, further comprising preparing the description of the needed resources by a software operating on the client computer.

15. The computer implemented method according to claim 13, further comprising downloading the description of the needed resources to the storage computer from the client computer via the network connection between the client computer and the storage computer.

16. The computer implemented method according to claim 13, wherein the client computer is configured to disable initiation of the network connection between the client computer and the storage computer by the client computer.

17. The computer implemented method according to claim 13, wherein the client computer is within a restricted network, wherein the storage computer is outside the restricted network, wherein the restricted network is configured to disable initiation of the network connection between the client computer and the storage computer by the client computer.

* * * * *